United States Patent
Watanabe et al.

[11] Patent Number: 5,980,082
[45] Date of Patent: Nov. 9, 1999

[54] ROBOT MOVEMENT CONTROL DEVICE AND MOVEMENT CONTROL METHOD

[75] Inventors: Atsushi Watanabe; Tetsuya Kosaka; Tomoyuki Yamamoto, all of Oshino, Japan

[73] Assignee: Fanuc Limited, Yamanashi, Japan

[21] Appl. No.: 08/793,758

[22] PCT Filed: Jul. 5, 1996

[86] PCT No.: PCT/JP96/01878

§ 371 Date: Mar. 3, 1997

§ 102(e) Date: Mar. 3, 1997

[87] PCT Pub. No.: WO97/02114

PCT Pub. Date: Jan. 23, 1997

[30] Foreign Application Priority Data

Jul. 5, 1995 [JP] Japan ................................. 7-169487

[51] Int. Cl.[6] .................................................. G05B 19/42
[52] U.S. Cl. .......................................... 364/191; 364/192
[58] Field of Search .................................. 364/191, 192; 395/99, 83, 80, 85; 318/568.13, 568.14; 901/3, 4, 5

[56] References Cited

U.S. PATENT DOCUMENTS

| | | | |
|---|---|---|---|
| 4,025,838 | 5/1977 | Watanabe | 395/92 |
| 4,481,568 | 11/1984 | Inaba et al. | 364/474.2 |
| 4,482,968 | 11/1984 | Inaba et al. | 364/474.2 |
| 4,757,459 | 7/1988 | Lauchnor et al. | 395/99 |
| 4,815,011 | 3/1989 | Mizuno et al. | 395/99 |
| 4,998,050 | 3/1991 | Nishiyama et al. | 395/83 |

FOREIGN PATENT DOCUMENTS

| | | |
|---|---|---|
| 0 416 123 | 3/1991 | European Pat. Off. . |
| 58-155188 | 9/1983 | Japan . |
| 59-153207 | 9/1984 | Japan . |
| 4-98404 | 3/1992 | Japan . |
| 4-112211 | 4/1992 | Japan . |
| 5-134738 | 6/1993 | Japan . |
| 6-4124 | 1/1994 | Japan . |

*Primary Examiner*—Albert DeCady
*Assistant Examiner*—Shelly A Chase
*Attorney, Agent, or Firm*—Staas & Halsey

[57] ABSTRACT

The present invention corrects a teaching point set in a robot movement control program to another position using jog-feed buttons. A robot tool is moved by jog-feed buttons using a jog-feed command unit toward a position to which a teaching point is to be corrected. When the position of the tool approaches any teaching point contained in a movement command program, the robot is automatically shifted to the teaching point to be corrected in the movement command program. When the teaching point to be corrected is found, correction of a teaching point from the closest teaching point to the position to be corrected is then performed.

6 Claims, 6 Drawing Sheets

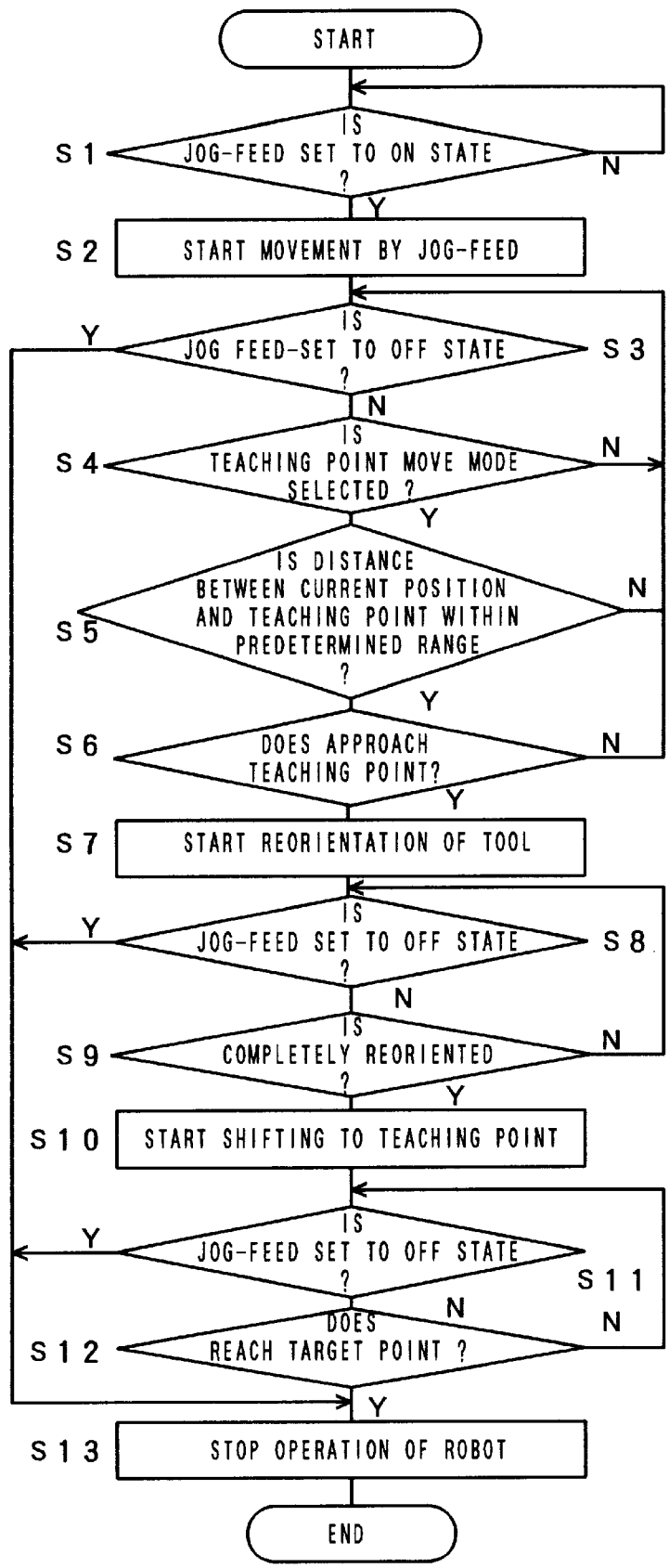

ROBOT MOVEMENT CONTROL DEVICE AND MOVEMENT CONTROL METHOD

TECHNICAL FIELD

This invention relates to a robot movement control device and a robot movement control method to correct a teaching point set in a program to another position according to the movement of a tool.

BACKGROUND ART

In conventional control of an industrial robot, an operator teaches a target point for the movement of a tool attached to the end of a robot arm, and a robot is moved according to a program generated so that the robot reaches this teaching point. Such a teaching point specified by the program is sometimes deviated from a set point as the result of varying the position or direction of a workpiece during work. In this case, it is necessary to correct the teaching point deviated from the set point, as a matter of course.

When correction of a teaching point is performed in conventional robot control device, a command block of the teaching point is specified on the screen of a teaching pendant, and the robot is moved to the specified teaching point, and is further moved by jog-feed from the specified teaching point to a corrected teaching point. When the robot reaches the corrected teaching point, a coordinate point of the command block is automatically corrected by instructing correction on the teaching pendant.

However, the conventional robot control device described above needs to find the correspondence between a teaching point to be corrected and its command block. Even if this correspondence is found, it is necessary to alternate execution of a program and jog-feed operation with each other, and as a result, working efficiency is degraded.

DISCLOSURE OF THE INVENTION

It is an object of the present invention to provide a robot movement control device and a robot movement control method, which enable correction of a teaching point easily with accuracy.

In order to attain the above object, as one mode of a robot movement control device according to the present invention, there is provided a robot movement control device which moves a robot tool to a predetermined teaching point and comprises a program storage unit for storing a program to instruct the robot to be moved to the predetermined teaching point, a jog-feed command unit for instructing the robot to be moved by the jog-feed, a jog-feed control unit for moving the robot by the jog-feed in the direction instructed by the jog-feed command unit, and a teaching-point directional movement control unit for watching the position of the robot moved by the jog-feed, and instructing the jog-feed control unit to shift the robot to a teaching point to which the robot comes closer, when the robot approaches any teaching point in the movement command program.

Preferably, the teaching-point directional movement control unit is configured to shift the robot tool after the tool is reoriented to a posture instructed by the program.

As another mode of the robot movement control device according to the present invention, there is provided a robot movement control device which moves a tool of a robot to a predetermined teaching point and comprises a program storage unit for storing a program to instruct the robot to be moved to the predetermined teaching point, a jog-feed command unit for instructing the robot to be moved by the jog-feed, a jog-feed control unit for moving the robot by the jog-feed in the direction instructed by the jog-feed command unit a shifting command unit for instructing the robot to be shifted to a predetermined teaching point, and a teaching-point directional movement control unit for instructing the jog-feed control unit to shift the robot to a teaching point, which is the closest to the position of the robot among teaching points in the movement command program, when the instruction to shift the robot is performed.

Further, in a robot movement control method according to the present invention, a teaching-point move mode is set in a control device for controlling a robot. When the control device enters this teaching-point move mode by switching operation to move a tool attached to the end of a robot arm by the jog-feed toward a target position to which the teaching point is to be corrected a numerical control unit decides during the jog-feed as to whether or not the current position of the tool is within the range of a predetermined distance from a programmed teaching point. When decided that the current position of the tool is within the predetermined range, the tool is forcibly shifted to the programmed teaching point, and is positioned at the target teaching point to be corrected. Further, when the current position of the tool is within the predetermined range of the programmed teaching point, the tool is shifted to the teaching point after the tool is reoriented to the direction taught in the programmed teaching point.

According to the present invention, first, the tool is moved in the direction commanded by the jog-feed command means. When the tool approaches any teaching point in the movement command program, the robot is operated to shift the tool to the teaching point. As a result, an operator is able to judge a position, in which the robot is stopped, to be one of teaching points in the movement command program. Further, if the tool is fed by jog-feed from this teaching point to a position to be set as a new teaching point, it is possible to correct a teaching point from a programmed teaching point to a target point for the movement of the tool.

BRIEF DESCRIPTION OF THE DRAWINGS

FIG. 6 is a flowchart showing a procedure on the side of a robot control device for controlling the movement of a robot according to the embodiment.

BEST MODE FOR EMBODYING THE INVENTION

Figure 1:
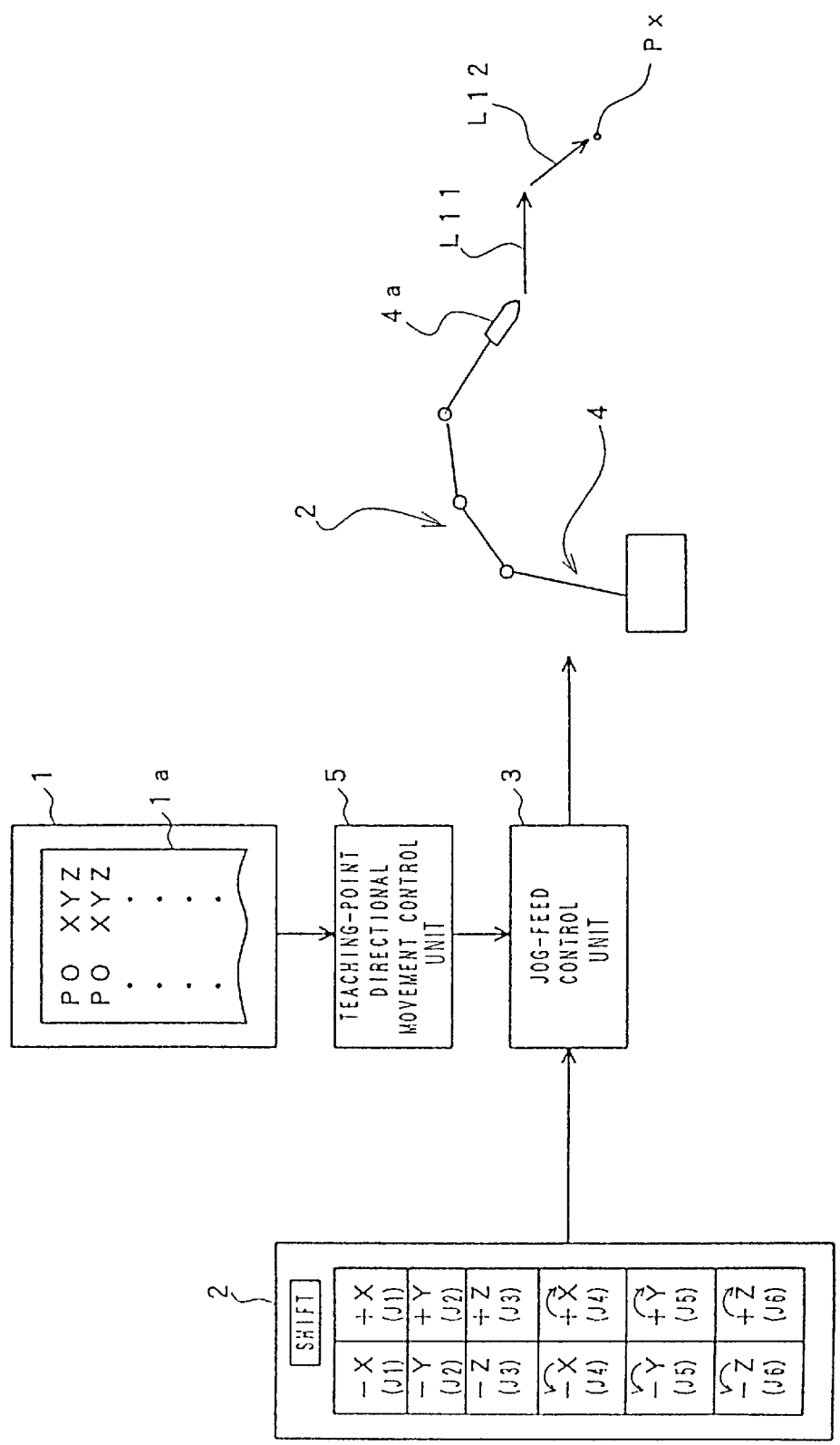
FIG. 1 is a conceptual view for explaining the function of one embodiment according to the present invention.

First of all, a description will be given of the outline of a function according to an embodiment of the present invention with reference to FIG. 1. A program 1*a* to instruct a robot to be moved to a predetermined teaching point is stored in a program storage unit 1. A jog-feed control unit 3 moves a robot by jog-feed in the direction instructed by a jog-feed command unit 2. For instance, the jog-feed control unit 3 moves a tool 4*a* along a jog command route L11. A teaching-point directional movement control unit 5 watches the position of a robot 4 moved by jog-feed, and instructs jog-feed control unit 3, when the tool 4a (that is, a tool center point) of the robot 4 approaches any teaching point Px, to shift the tool 4a of the robot 4 to the teaching point Px in the movement command program 1a. As a result, the tool 4a goes out of the jog-command route L11 and is shifted toward the teaching point Px along a route L12.

Figure 2:
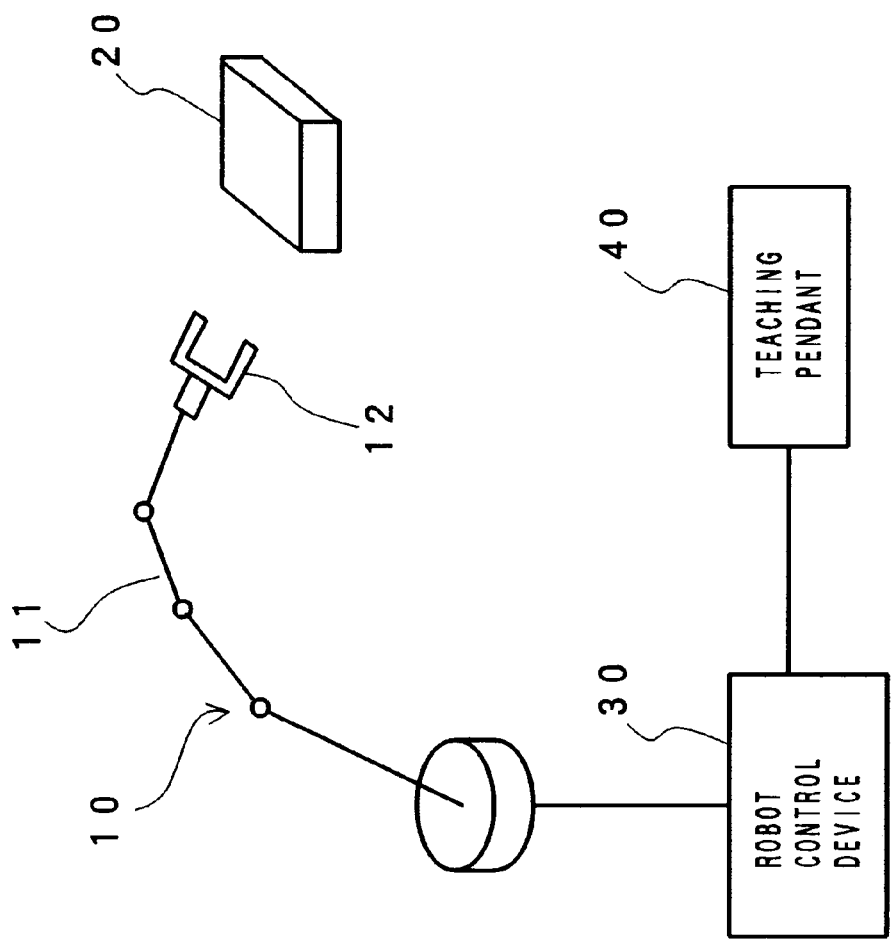
FIG. 2 is a view showing the overall configuration of a robot control system including a robot movement control device according to the embodiment.

A description will now be given of the overall configuration of a robot control system for embodying a robot movement control device as one embodiment of the present invention with reference to FIG. 2. A tool 12 is attached to the end of an arm 11 of a robot 10. The robot 10 is adapted to machine or carry a workpiece 20, and its operation is controlled by a robot control device 30. The operation of the robot 10 is instructed by a teaching pendant 40 connected to the robot control device 30. The teaching pendant 40 has such a size as to make handy for an operator to carry. The teaching pendant 40 includes a liquid crystal display panel and various keys as will be described later.

Figure 3:
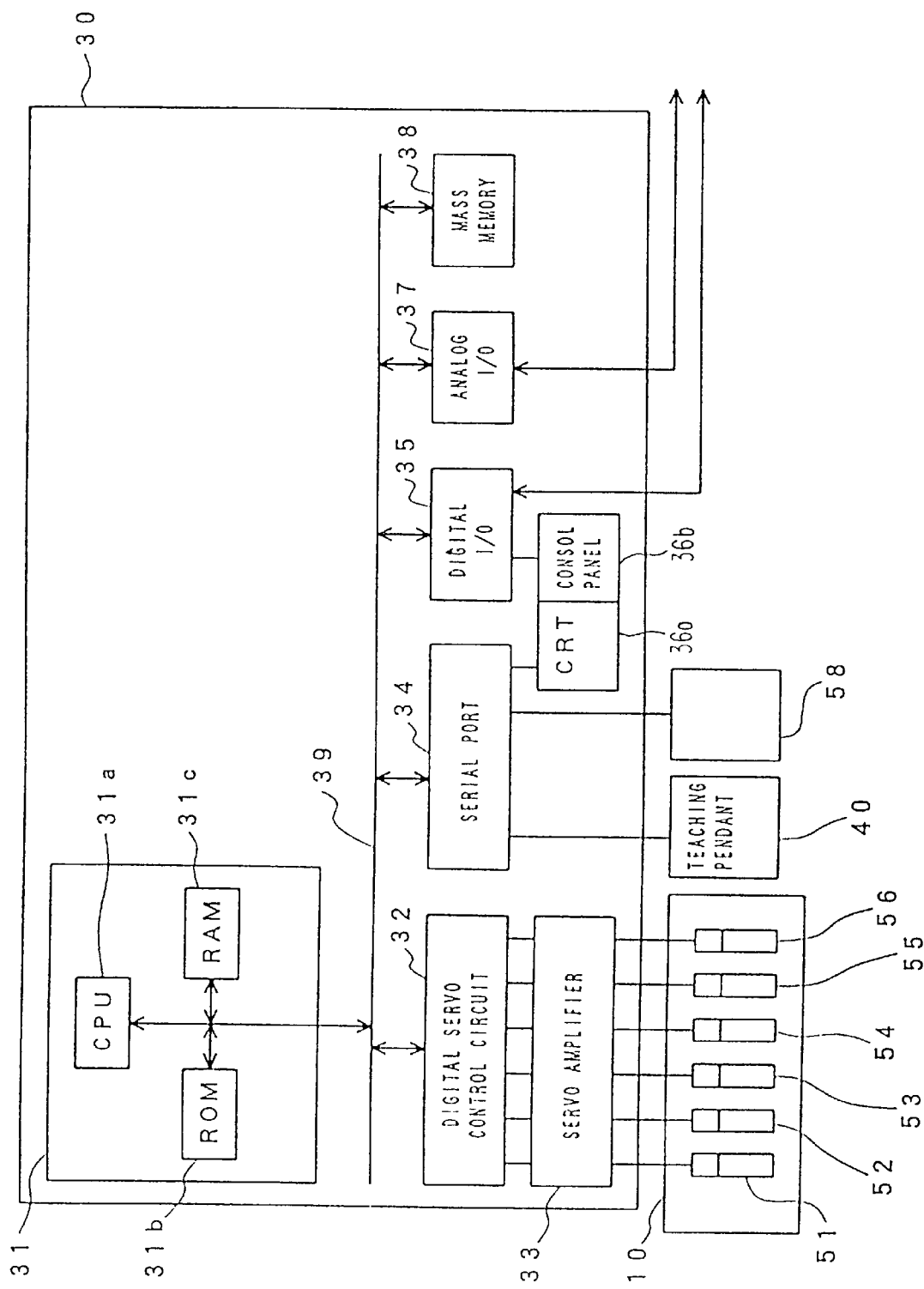
FIG. 3 is a block diagram showing the hardware configuration of a robot control device.

FIG. 3 is a block diagram showing the hardware configuration of the robot control device 30. The robot control device 30 includes a processor board 31. This processor board 31 includes a processor 31a, ROM 31b and RAM 31c. The processor 31a controls the entire robot control device 30 according to a system program stored in ROM 31b. Various data such as a movement command program of the robot 10 are stored in RAM 31c. Coordinates of a teaching point and the direction (i.e., coordinates of an axis of rotation) of the tool 12 are stored in each command block of the movement command program. Such a processor board 31 is connected to a bus 39.

A digital servo control circuit 32 is connected to the bus 39, and drives servo motors 51, 52, 53, 54, 55 and 56 through a servo amplifier 33 according to the command from the processor board 31. These servo motors are built in the robot 10 and operate each axis of the robot 10.

A serial port 34 is connected to the bus 39, and also connected to both the teaching pendant 40 with a display and other RS232C apparatus 58. The teaching pendant 40 has a size to make handy for an operator to carry, as described above, and is provided with a jog-feed button and a teaching point correction button or the like on the panel. CRT display 36a may be optionally connected to the serial port, and it is possible to check the working state or the like on the CRT display 36a.

A console panel 36b is connected to a digital I/O unit 35, and the movement of the robot 10 may be instructed at the position of the robot control device 30 through the teaching pendant. A drive portion to grip the tool 12 is connected to the digital I/O unit 35 which is able to instruct the gripping operation. When a machining head for laser welding is used for the tool 12, for instance, a welding power supply is connected to an analog I/O unit 37, and a welding voltage is instructed through the analog I/O unit 37. Teaching data and others are stored in a mass memory 38.

Figure 4:
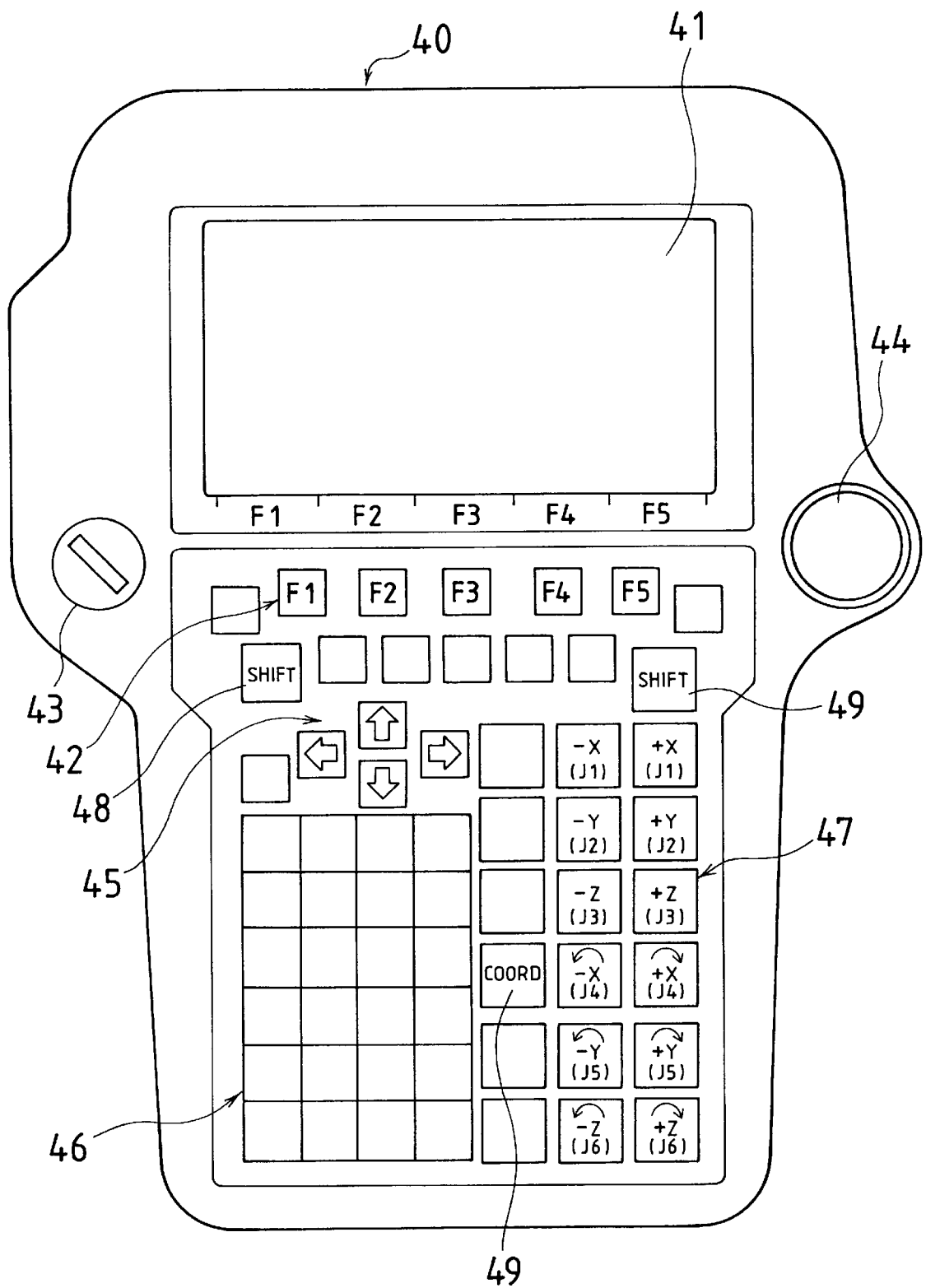
FIG. 4 is a view showing the schematic configuration of a panel face of a teaching pendant.

FIG. 4 is a view showing the schematic configuration of a panel face of the teaching pendant 40. A display screen 41 is a liquid crystal screen, for instance, and detailed data or similar data in the movement command program is selectively displayed by switching. A function key 42 is a key which selects a menu displayed on the lower end of the display screen 41. This function key 42 also serves to perform switching to a teaching-point move mode and to instruct a correction of a teaching point. A teaching pendant valid switch 43 is a switch which makes the of the teaching pendant 40 invalid from valid and vice versa.

An emergency stop button 44 is a button which stops the operation of the robot 10 in an emergency. A cursor key 45 is a key which moves a cursor displayed on the display screen 41. A ten-key pad 46 includes numerical keys and other keys which enable the input and deletion of numerical values and characters.

A jog-feed command unit includes a shift button 48 and jog-feed buttons 47. First, either an orthogonal coordinate system (X, Y, Z) or each joint axis (J1 to J6) is selected by depressing a coordinate selection button 49. In case where the orthogonal coordinate system is selected, if any one of the jog-feed 47 buttons indicating plus or minus linear direction for each of X, Y and Z axis is selectively depressed together with the shift button 48, then the robot is moved by jog-feed in the selected direction for the selected axis. On the other hand, if any one of the jog-feed buttons 47 indicating plus or minus rotational direction about each of X, Y and Z axis is selectively depressed together with the shift button 48, then the robot is moved by jog-feed in the selected rotational direction about a selected axis. Further, in case where individual joint-axis feed mode comes into effect by depressing the coordinating selection button 49, if any one of the jog-feed buttons 47 for each joint axis (J1 to J6) is selectively depressed, then jog-feed of the robot for the selected joint axis is carried out.

A description will now be given of the specific processing contents of the robot movement control device as one embodiment of the present invention.

Figure 5:
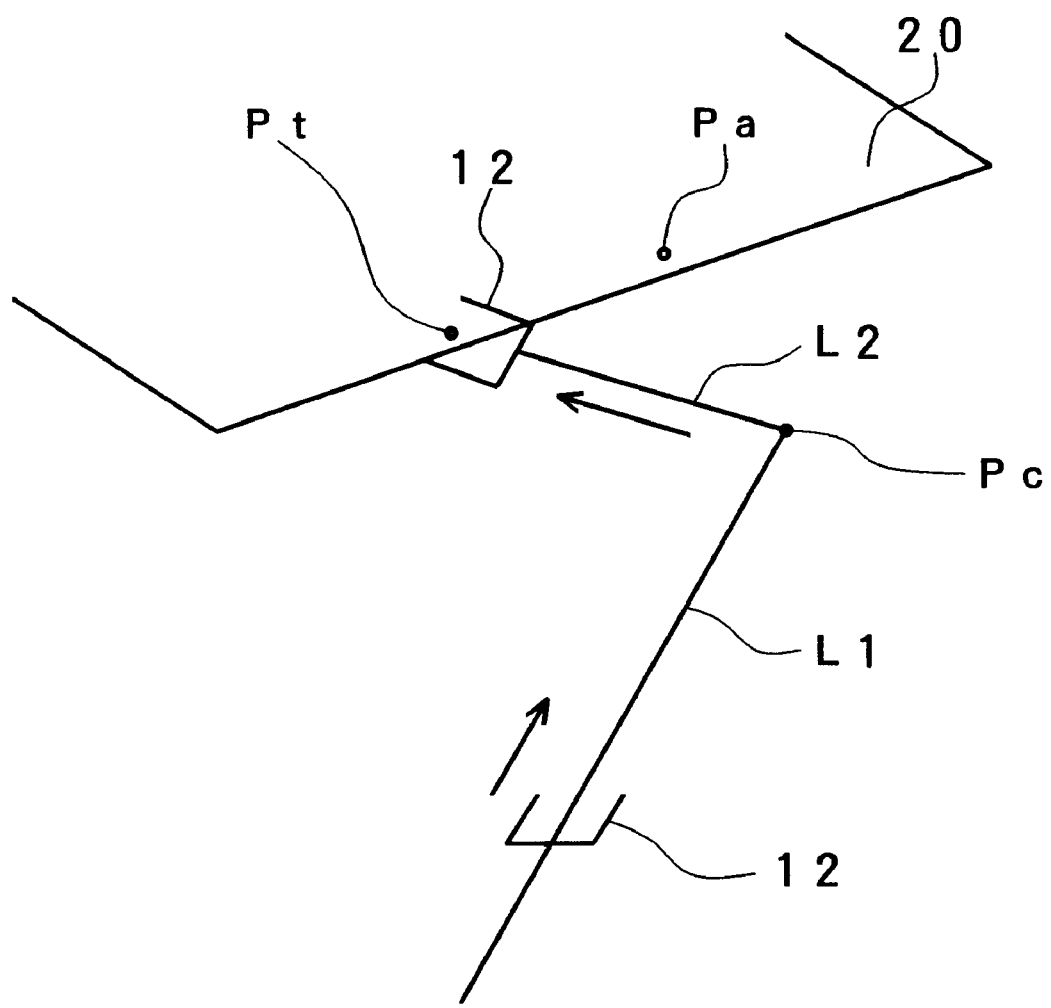
FIG. 5 is a view showing the operation of a tool of a robot.

FIG. 5 is a view showing the operation of the tool 12 of the robot 10. In this case, a workpiece 20 is a thin sheet, and the robot performs the operation of gripping this thin sheet (i.e., workpiece 20 ). A point Pt of the workpiece 20 is assumed to be a teaching point predetermined in the movement command program. A description will now be given of a case where an attempt to shift the tool 12 to a point Pa is made in order that the point Pa close to the teaching point Pt is set as a new teaching point in place of the point Pt.

First, an operator depresses the jog-feed button 47 on the teaching pendant 40 to shift the tool 12 (i.e., a tool center point) toward the target point Pa (along the route L1). During the movement of the tool 12, the teachingpoint directional movement control unit 5 watches at all times the position of the tool moved by the jog-feed. When the tool 12 enters the range of a predetermined radius from the teaching point Pt during the shifting of the tool 12 toward the point Pa, the teaching-point directional movement control unit 5 detects the approach of the tool 12. In this case, "the range of a predetermined radius" unit a distance set to be shorter to some extent than the distance between this point Pa and any other teaching point.

The teaching-point directional movement control unit 5 reorients the tool 12, at the detected position Pc, so that its direction is same as the direction specified in the teaching point Pt. Then this reoriented tool 12 is shifted toward the teaching point Pt along the different track (along the route L2). When the tool 12 reaches the teaching point Pt, the tool 12 is stopped. When the tool center point of the tool 12 is stopped at the teaching point Pt, the correction of the teaching point is performed according to a method similar to the conventional method. That is, the operator depresses the jog-feed button 47 to shift the tool to the target point Pa. When the tool reaches the point Pa, the correction of the teaching point is instructed by depressing the function key 42 or the like. As a result, rewrite from the coordinate data of the teaching point Pt to the coordinate data of the point Pa is performed on the side of the robot control device 30.

A description will now be given of the procedure in case where the processor 31a of the robot control device 30 performs the above operation with reference to the flowchart shown in FIG. 6.

The function key 42 is depressed to switch a mode to the teaching-point move mode, and the jog-feed button 47 is depressed to start a shifting control so as to shift a teaching point toward a position to be corrected (Step S1). An axis is controlled according to the selected coordinate system and the axis and its direction corresponding to the depressed jog-feed button 47, and the jog-feed of the tool 12 is started (Step S2). It is decided as to whether or not the jog-feed command is in the off state (Step S3). When the jog-feed command is not in the off state, it is decided as to whether or not the teaching-point move mode is selected (Step S4). When the teaching-point move mode is not selected, processing is returned to Step S3. On the other hand, when the teaching-point move mode is selected, it is decided as to whether or not the position of the jog-fed tool 12 is within the range of a predetermined radius (i.e., within the predetermined distance) from any teaching point in the movement command program (Step S5). When decided that the position of the tool 12 is outside the range of the predetermined distance, processing is returned to Step S3. On the other hand, when decided that the position of the tool 12 is within the range of the predetermined distance, then it is decided as to whether or not the tool 12 approaches the teaching point (Step S6). When decided that the tool approaches the teaching point, processing is advanced to Step S7. On the other hand, when decided that the tool is moved away from the teaching point, processing is returned to Step S3.

That is, while the jog-feed command is in the on state, processing in Steps S3 to S5 is repeatedly executed. When the distance between the current position of the tool 12 and the teaching point is within the predetermined range (Step S5), it is decided as to whether or not the tool approaches the teaching point by the jog-feed (Step S6). When decided that the tool approaches the teaching point by the jog-feed, processing is advanced to Step S7. In Step S7, the tool 12 is automatically reoriented to the direction as it is programmed in the above teaching point. Further, it is decided as to whether or not the jog-feed command is in the off state (Step S8). When decided that the jog-feed command is not in the off state, then it is decided as to whether or not the tool 12 is completely reoriented (Step S9). Processing in Steps S8 and S9 is repeatedly executed until the tool 12 is completely reoriented.

After the tool 12 is completely reoriented, the shifting of the tool 12 toward the teaching point Pt is automatically started (Step S10). Then, it is repeatedly decided as to whether or not the jog-feed command is in the off state, and whether or not the tool 12 reaches the target teaching point Pt when decided that the jog-feed command is not in the off state (Steps S11 and 12). When the tool 12 reaches the target teaching point Pt, the robot is stopped even if the jog-feed command is in the on state (Step S13). In this manner, when the operation of the robot is stopped even if the jog-feed command is in the on state, the tool 12 is regarded as having reached the teaching point. Therefore, the correction of the teaching point is afterward performed according to the same method as the conventional method.

Incidentally, when the robot 10 is stopped before the tool 12 exactly reaches its desired teaching point (i.e., when the tool is stopped at a wrong teaching point), the jog-feed command is set to the on state to move the tool 12 away from the teaching point. As a result, processing in Steps S1 to S6 is executed. In this case, since the tool does not approach the teaching point in Step S6, processing is returned to Step 3, and the tool 12 is moved away from the teaching point in the same condition. Then, the tool is moved by jog-feed toward the desired teaching point, and processing in Steps S1 to S13 is executed to position the tool 12 at the desired teaching point. When the jog-feed command is set to the off state in Steps S3, S8 and S11 before the tool 12 reaches the teaching point, the movement of the robot is stopped. However, in this case, when the jog-feed command enters again, processing in Steps S1 to S13 is executed, and therefore, the tool is able to be moved to and stopped at the desired teaching point.

As described above, according to the present invention, when a tool approaches a teaching point set in advance in the movement command program while moving by jog-feed toward a point to be set as a new teaching point, the tool is automatically shifted to the predetermined teaching point. Therefore, an operator is able to recognize that the position where the robot 10 is stopped is a teaching point in the movement command program. Further, if the tool is moved by jog-feed from that position to a target position (i.e., a point to be set as a new teaching point) according to the conventional operation, it is possible to perform the correction of a teaching point. Therefore, time required for work is reduced.

Further, according to the embodiment of the present invention, when the movement according to the jog-feed command inputted by the operator is changed to the automatic shifting to a teaching point, the direction of the tool 12 is changed to the same direction as the direction specified by the program data of the teaching point before change of the moving direction. Therefore, it is possible to prevent the tool from interfering with another part of a workpiece, and work with more accuracy is enabled.

According to the embodiment of the present invention, the tool is automatically shifted toward the teaching point at a point of time when the tool approaches the teaching point. However, this shifting may also be made according to the operator's specific operation on the teaching pendant 40.

Further, in the embodiment of the present invention, a description has been given of a case where the tool 12 of the robot 10 grips a workpiece. But, the present invention may be applied to a tool such as a welding head.

We claim:

1. A robot movement control device for moving a robot tool to a predetermined teaching point, comprising:

a program storage means for storing a program to instruct the robot to be moved to the predetermined teaching point;

a jog-feed command means for instructing the robot to be moved by the jog-feed;

a jog-feed control means for moving said robot by the jog-feed in the direction instructed by said jog-feed command means; and a teaching-point directional movement control means for monitoring a position of the robot moved by the jog-feed, determining the teaching point located nearest to said position, and instructing said jog-feed control means to shift said robot, when it approaches any teaching point in the movement command program, to said teaching point located nearest to said position.

2. A robot movement control device according to claim 1, wherein said teaching-point directional movement control means shifts said robot tool after said tool is reoriented to a posture instructed by said program.

3. A robot movement control device for moving a robot tool to a teaching point given in advance, comprising:

a program storage means for storing a program to instruct the robot to be moved to the predetermined teaching point;

a jog-feed command means for instructing the robot to be moved by the jog-feed;

a jog-feed control means for moving said robot by the jog-feed in the direction instruction by said jog-feed command means;

a shifting command means for instructing the robot to be shifted to a teaching point given in advance; and a teaching-point directional movement control means for instructing said jog-feed control means to shift said robot to a teaching point which is the closest to a position of said robot among the teaching points in said movement command program, when said instruction to shift the robot is performed.

4. A method of robot movement control which moves a robot tool to a predetermined teaching point, comprising the steps of:

storing the robot movement command program having a plurality of teachings points used to instruct the robot to move along a path;

moving the robot to a position through the use of jog-feed buttons;

monitoring and storing said position of the robot moved by the jog-feed buttons;

determining which teaching point stored in the program having a plurality of teaching points is located nearest to said position;

moving said robot in accordance with said movement command program; and shifting the movement of said robot to said position, when the robot approaches said teaching point located nearest to said position.

5. A method of robot movement control as recited in claim 4, wherein said determining step determines which teaching point is located nearest to said position using a minimum predetermined distance.

6. A method of robot movement control which corrects a teaching point set in a robot movement command program by moving a robot tool to a predetermined teaching point, comprising the steps of:

storing the robot movement command program having a plurality of teachings points used to instruct the robot to move along a path;

moving the robot to a position through the use of jog-feed buttons;

monitoring and storing said position of the robot moved by the jog-feed buttons;

executing said robot movement control program;

moving said robot in accordance with said movement command program being executed; and shifting the movement of said robot to said position, when the robot approaches a teaching point that is within a predetermined distance to said position.

* * * * *